(No Model.) 2 Sheets—Sheet 1.
J. H. FRISCHEN & R. PFEIL.
TRAIN OPERATED DEVICE.
No. 513,498. Patented Jan. 30, 1894.
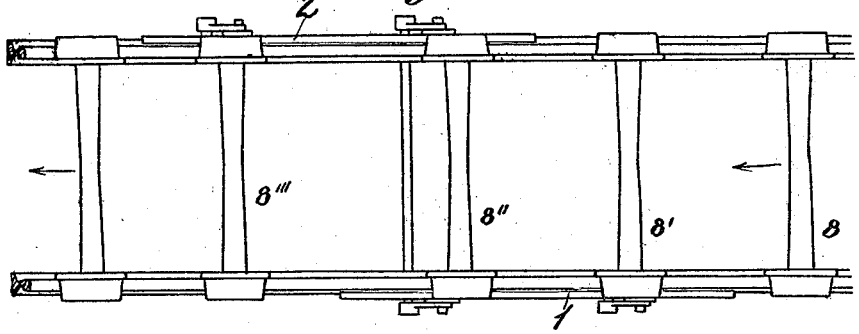
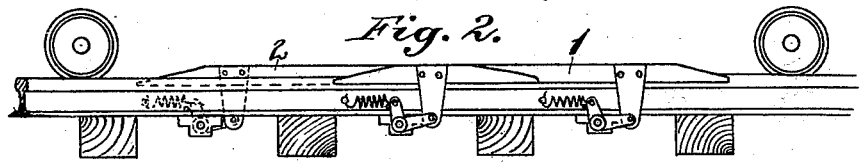
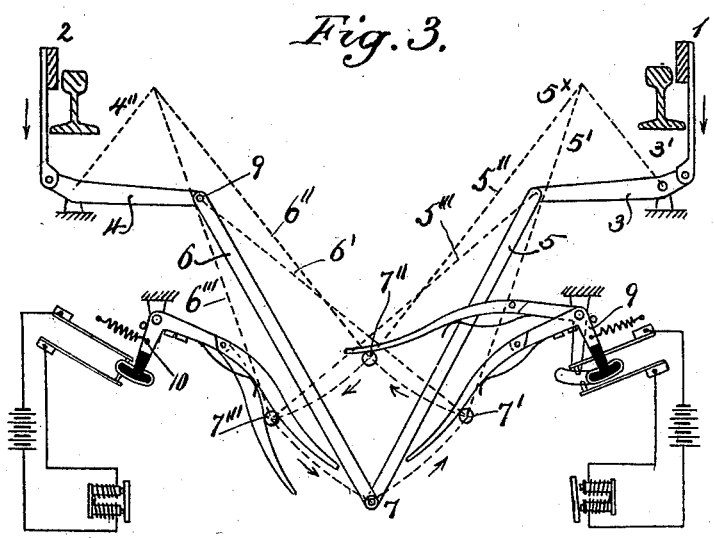
WITNESSES:
INVENTORS
Johann Heinrich Frischen
and Robert Pfeil.
BY
ATTORNEY (No Model.) 2 Sheets—Sheet 2.
J. H. FRISCHEN & R. PFEIL.
TRAIN OPERATED DEVICE.
No. 513,498. Patented Jan. 30, 1894.
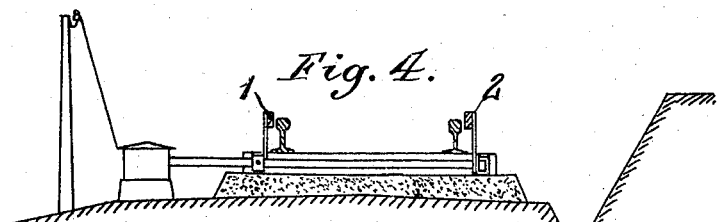
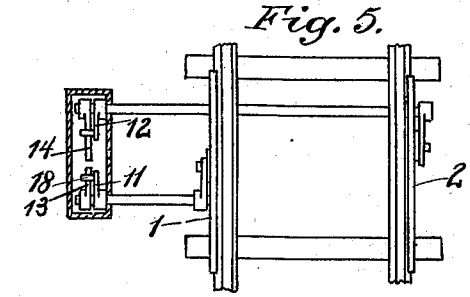
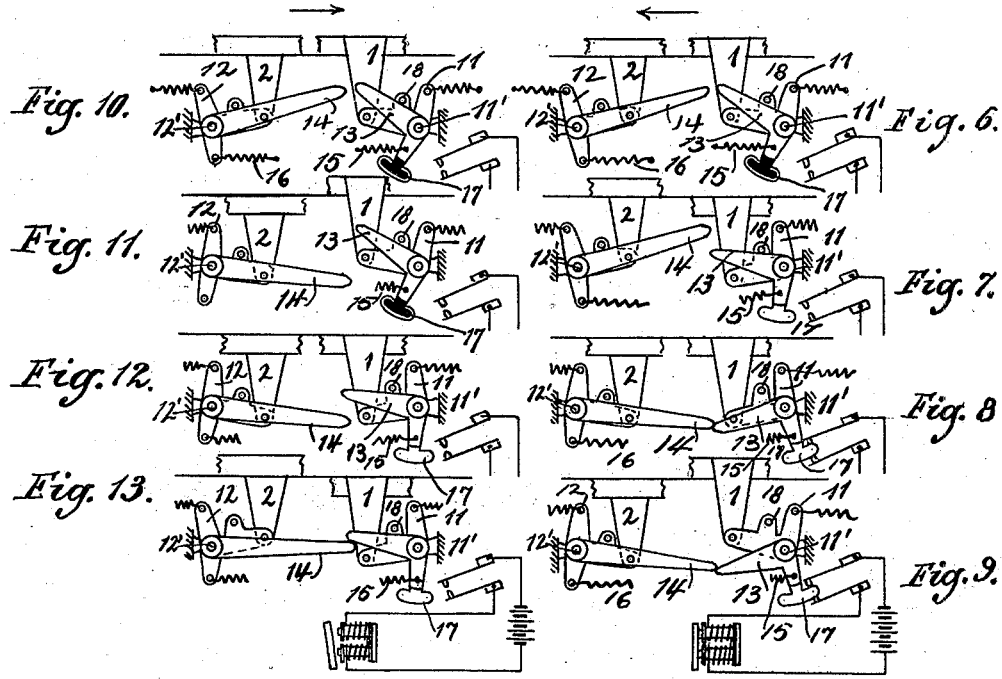
WITNESSES:
INVENTORS
Johann Heinrich Frischen
and Robert Pfeil.
BY
ATTORNEY

UNITED STATES PATENT OFFICE.

JOHANN HEINRICH FRISCHEN AND ROBERT PFEIL, OF BERLIN, GERMANY, ASSIGNORS TO SIEMENS & HALSKE, OF SAME PLACE.

TRAIN-OPERATED DEVICE.

SPECIFICATION forming part of Letters Patent No. 513,498, dated January 30, 1894.

Application filed November 28, 1893. Serial No. 492,245. (No model.)

*To all whom it may concern:*

Be it known that we, JOHANN HEINRICH FRISCHEN and ROBERT PFEIL, subjects of the King of Prussia, German Emperor, residing at the city of Berlin, Kingdom of Prussia, German Empire, have invented new and useful Improvements in Train-Operated Devices, of which the following is a specification.

This invention relates to improvements in train operated devices, and the main object of the invention is to provide train-operated contact devices which shall have different effects upon corresponding signal devices according to the direction in which an engine or train moves over them.

In carrying out our invention we provide for every contact two track pedals which, when a car passes them, are pressed down by the wheels thereof. In the transverse position of the pedals they can be placed respectively, one to each side of a rail, both upon the same side of a rail, or one to each of the two rails of a track. In their longitudinal positions these two pedals are so arranged that when being run over, first one is pressed down, then both of them, and then the second pedal is depressed, the operation taking place according to the direction in which the train is moving over them.

Referring to the drawings which illustrate our invention Figure 1 is a plan view of a section of track with a car moving thereover, showing my invention applied thereto. Fig. 2 is a side elevation of the pedal devices in operative relation to a railway track and a car passing thereover. Fig. 3 is a detail of the pedal mechanism in operative relation to the two tracks of the railway together with circuit connections. Fig. 4 is a cross section of a section of track showing a modified form of track pedal applied thereto in operative relation with signaling devices. Fig. 5 is a plan view of said modification partly in section; and Figs. 6 to 13 inclusive are details of the pedal mechanism and operating devices, showing the positions assumed at different stages of the passages of a car or train in either direcion over a section of track.

Referring first to Figs. 1, 2 and 3, 1 and 2 represent two track pedals connected respectively to pivoted levers 3, 4, in such a manner that when either of the pedals is depressed the outer arm of said lever will also be depressed, and the long inner arm thereof correspondingly raised. The free inner ends of these levers 3, 4, are joined by the connecting rods 5, 6, secured to each other by a joint or pivotal connection 7. This common point 7 of rotation of the connecting rods 5 and 6 describes, when either of the track pedals is depressed, an arc of a circle, as shown in dotted lines in Fig. 3, the two arcs extending equal distances in opposite directions upon each side of said pivotal point. The direction in which this pivotal point travels depends entirely upon whether pedal 1 or pedal 2 is first depressed, and hence upon the direction of movement of the car upon the section of track. If for instance, a car 8 travels from right to left over the section of track shown, the pedal 1 will be depressed when the car has arrived at the point 8'. By this movement of the track pedal the lever 3 has been moved upward to the position shown in dotted lines at 3', and the pivotal point 7 is moved in an arc of a circle around a center 9 until it reaches the point 7', as the lever 6 is still held from longitudinal movement, for the reason that lever 4 has not been moved. The levers 5 and 6 will then occupy the position shown in dotted lines at 5' and 6'. When the car 8 advances to the point 8'' the second pedal 2 is also depressed while pedal 1 is still detained in its depressed position. By this depression of the track pedal 2, the lever arm 4 has been brought to the position in dotted lines at 4'', and at the same time the pivotal point 7' has been moved to 7'', by reason of the upward movement of the connecting rod 6, which then takes the position shown in dotted lines at 6''. It will be seen that this second movement of the pivotal point is also in an arc of a circle, as shown by the dotted lines and arrow. The pivotal point of the lever 5 in this latter movement is around $5^\times$. When the car reaches the point 8''' the track pedal 1 has been released and moved upward (as for instance by a retracting spring) whereupon the lever arm 3 will drop to its normal position and the lever 5 will move, carrying the pivotal point 7″ in an arc of a circle to 7‴. If then the car 8 leaves the track pedal 2, the original positions of the devices are restored. It will be understood that if the car moves in an opposite direction, that is from left to right, the pivotal point 7 will take the course 7, 7‴, 7″, 7′, 7. Operating in conjunction with the track pedal levers are two contact levers 9 and 10, the first of which is operated by the running of a train over the track from right to left and the corresponding actuation of the track pedal mechanism, while the other is not operated by the successive movements of the pivotal point 7 in the direction shown by the arrow in Fig. 3. When pivotal point 7 reaches the point 7′, a catch thereon engages said contact lever 9, and holds it in that position until the pivotal point is moved from 7′ to 7″, when it is carried along with said pivot and turns the lever, thereby actuating a signal device, either by making contact with electric terminals or by interrupting a continuous circuit. In its further travel toward 7‴ the contact lever 10 is met by the catch, but is not actuated thereby, as upon the release of the second pedal 2 the pivotal point will be transferred from 7‴ to its normal position 7.

It will of course be seen that instead of closing a circuit to a signal device by means of a contact lever, the mechanical operation of the pedal devices can actuate said signal and draw it down to the danger position mechanically. It is also possible to make use of the movement of the levers 5, 6, around pivotal point 7 to obtain a rotary movement of an axle in the middle of the road-bed for winding clockwork mechanism.

The arrangement of the contact levers is such that the same act similarly through the arcs 7 to 7′, and 7 to 7‴ and only make contact by movement through the arcs 7′ to 7″, and 7‴ to 7″. The object of this is to render their action independent of changes due to wear upon the levers and other operating parts.

The modification of our invention, shown in Figs. 4 to 13 inclusive, will now be described:— When the track pedals 1, 2 are depressed, the levers 11, 12, connected therewith will turn in equal arcs. These levers are mounted upon shafts 11′ and 12′, and upon these shafts are loosely mounted auxiliary levers 13, 14, which are provided with retractile springs 15, 16. The contact 17 is connected with the lever 13. These levers 13, 14, are placed opposite each other, as shown, and act co-operatively, the latter being preferably twice as long as the former. It will thus be seen that an equal rotation of the two lever arms will describe, in one case an arc of a certain length, and in the other an arc of double that length, so that the end of the longer lever will move twice as far as the end of the short one. However, the same effect can be obtained with levers of equal length as with levers of unequal length, as the lever first operated is placed below the other by the passage of the train over its track pedal. The positions of the device when being run over by a train from the right are shown in Figs. 6 to 9 inclusive, in which the separate positions correspond to the positions 8, 8′, 8″, 8‴, shown in Fig. 1 before referred to. Figs. 10 to 13 show the corresponding movement of a train, and the actuation of the pedal and co-operating mechanism by the movement of a train, from left to right. Figs. 6 and 10 show the position of the devices when at rest. If the car moves forward to the position shown at 8′ in Fig. 1, the pedal 1 is depressed and the lever 11 turned to the position shown in Fig. 7, said lever in its movement carrying with it, by means of a pin 18, a contact lever 13. When the car passes the point 8″, track pedal 2 is depressed and the lever 14 is carried down by it. Said lever 14 when thus depressed engages with the contact lever 13 and forces it to make a further rotation, independently of the movement of the lever 11, to the position shown in Fig. 8. It is this movement of the contact lever which makes or breaks (as the case may be) the contact to the signal device. This contact is preserved when track pedal 1 returns to its normal position, shown in Fig. 9, and the contact is not broken until track pedal 2 is again released by the running of the train over and away from said pedal, when the pedal will rise and carry with it the lever 14, which will thereby release the contact lever 13 and allow it to rise and break or make the circuit. The operating parts, it will be seen, are thus returned to their normal positions. If the track pedals are run over in the opposite direction, that is, from the direction of pedal 2, said pedal will, as will be seen from Figs. 10 to 13 inclusive, be depressed, whereupon its lever 14 will be depressed first, and hence will be incapable of transmitting any movement to the contact lever 13; consequently, no contact (or break in the circuit, as the case may be) will be effected.

We claim—

1. In a railway-signal operating mechanism, a pair of track pedal devices; connecting devices controlled thereby; auxiliary devices for each track pedal device; a signal-actuating device controlled by one auxiliary device; and means for operating said auxiliary device from the opposite track pedal device.

2. In an electrical train-operated mechanism, a pair of track instruments; circuit-making devices connected therewith; an electrically-actuated signal device controlled by one of said circuit-makers; and means controlled by the opposite track instrument for closing the circuit through said circuit maker to the signal device.

3. In a railway-signal operating mechanism, a pair of track pedals; a main lever mechanism for each track pedal; an auxiliary lever mechanism for each pedal controlled by the main lever mechanism of the opposite pedal; and signal-actuating devices controlled by said auxiliary lever mechanism.

4. In an electrical train-operated mechanism, a pair of track instruments; circuit-making devices connected therewith; electrically-actuated signal devices controlled by said circuit-makers; and means controlled by either track instrument for actuating the circuit-maker of the opposite instrument.

In testimony whereof we affix our signatures in the presence of two witnesses.

JOHANN HEINRICH FRISCHEN.
ROBERT PFEIL.

Witnesses:
OSCAR BIELEFELD,
GUSTAV STENZEL.